(12) United States Patent
Sweeney

(10) Patent No.: US 8,020,737 B2
(45) Date of Patent: Sep. 20, 2011

(54) RATCHETING STRAP-DOWN SYSTEM

(76) Inventor: Michael T. Sweeney, Laguna Beach, CA (US)

( * ) Notice: Subject to any disclaimer, the term of this patent is extended or adjusted under 35 U.S.C. 154(b) by 932 days.

(21) Appl. No.: 11/089,908

(22) Filed: Mar. 24, 2005

(65) Prior Publication Data
US 2006/0213941 A1 Sep. 28, 2006

(51) Int. Cl.
B60R 9/04 (2006.01)
(52) U.S. Cl. ......... 224/324; 224/321; 224/319; 224/568
(58) Field of Classification Search .................. 224/321, 224/309, 319, 324, 534, 536, 568, 570; 410/97, 410/100, 103
See application file for complete search history.

(56) References Cited

U.S. PATENT DOCUMENTS

| 3,339,607 | A | | 9/1967 | Howard | |
|---|---|---|---|---|---|
| 4,174,119 | A | | 11/1979 | Biles | |
| 4,186,644 | A | * | 2/1980 | Kurosaki | 84/422.1 |
| 4,227,286 | A | * | 10/1980 | Holmberg | 24/68 CD |
| 4,369,009 | A | * | 1/1983 | Fulford | 224/324 |
| 4,464,089 | A | * | 8/1984 | Allen | 410/97 |
| 4,793,535 | A | | 12/1988 | Johnson | |
| 4,823,443 | A | | 4/1989 | Waters | |
| 4,896,519 | A | | 1/1990 | Pitts | |
| 5,052,604 | A | * | 10/1991 | Tourangeau | 224/274 |
| 5,095,722 | A | | 3/1992 | Chapmond et al. | |
| 5,177,986 | A | | 1/1993 | Jensen | |
| D337,980 | S | * | 8/1993 | Ng | D12/412 |
| 5,282,706 | A | | 2/1994 | Anthony et al. | |
| 5,358,162 | A | * | 10/1994 | Hill | 224/324 |
| 5,582,044 | A | | 12/1996 | Bolich | |
| 5,692,403 | A | | 12/1997 | Ling | |
| 5,752,635 | A | * | 5/1998 | Blankenburg | 224/321 |
| 5,775,557 | A | * | 7/1998 | Arvidsson | 224/310 |
| 5,941,666 | A | | 8/1999 | Waters | |
| 5,961,263 | A | | 10/1999 | Nunez | |
| 5,993,127 | A | | 11/1999 | Shinn | |
| 6,044,669 | A | * | 4/2000 | Levi | 70/18 |
| 6,164,507 | A | | 12/2000 | Dean et al. | |
| 6,199,412 | B1 | | 3/2001 | Kennedy | |
| 6,230,951 | B1 | | 5/2001 | Anderson | |
| 6,318,612 | B1 | | 11/2001 | MacNeil | |
| 6,510,717 | B1 | | 1/2003 | Levi | |
| 6,524,041 | B1 | | 2/2003 | Voiculescu | |
| 6,561,398 | B1 | * | 5/2003 | Cole et al. | 224/324 |
| 6,609,275 | B1 | | 8/2003 | Lin | |
| 6,652,205 | B2 | | 11/2003 | Christensen | |
| 6,698,723 | B1 | * | 3/2004 | Antonini | 254/391 |
| 6,715,653 | B2 | | 4/2004 | DeCosta | |
| 6,938,782 | B2 | * | 9/2005 | Dean et al. | 224/924 |
| 6,971,826 | B2 | * | 12/2005 | Valentine | 410/50 |
| 2001/0043845 | A1 | | 11/2001 | Christensen | |
| 2002/0197126 | A1 | * | 12/2002 | Tatina | 410/7 |
| 2003/0173384 | A1 | | 9/2003 | Clark et al. | |
| 2004/0040870 | A1 | | 3/2004 | Morrison et al. | |

* cited by examiner

Primary Examiner — Justin M Larson
Assistant Examiner — Corey N Skurdal
(74) Attorney, Agent, or Firm — Myers Andras Sherman & Zarrabian LLP; Joseph C. Andras

(57) ABSTRACT

A ratcheting strap-down system for use with a crossbar to securely transport any variety of objects. The ratcheting strap-down assembly includes a ratcheting receiver and a cam clamp receiver. The ratcheting receiver includes a ratcheting assembly and a locking mechanism and is adapted to engage a second end of a flexible strap. The flexible strap is preferably made from reinforced steel cog belt, making the system and the objects it's securing less susceptible to theft. The ratcheting strap-down system is particularly useful for securing one or more surfboards to the crossbars of an after-market roof rack assembly.

25 Claims, 7 Drawing Sheets

RATCHETING STRAP-DOWN SYSTEM

BACKGROUND OF THE INVENTION

1. Field of the Invention

The invention relates generally to automotive roof racks and more particularly to a strap-down or tie-down system for securing items of different size and shape to crossbars on the roof of an automobile.

2. Description of the Prior Art

A driver often secures a large or bulky item to the roof of his car, van, truck, or SUV, in order to move it from one place to another. Some automobiles have factory-installed roof racks with posts or side rails that rise up from the roof and two or more crossbars. However, many automobiles are not factory equipped with a roof rack of any sort. As a result, there are a number of competing roof rack systems made by after-market companies. Two such companies are Yakima and Thule.

As shown in FIG. 1, the after-market roof rack systems typically include a base rack assembly consisting of two crossbars that are elevated above the automobile's roof. As shown in FIG. 2, the Yakima-brand roof rack systems use circular crossbars. As shown in FIG. 3, the Thule-brand roof rack systems use rectangular crossbars.

In either case, the elevated crossbars prevent the item from damaging the vehicle and provide a convenient structure for securing the item to the vehicle with conventional tie-down materials such as rope, straps, twine, bungee-cords, or the like. Also available, especially for use in connection with the after-market roof rack system, are a wide variety of optional tie-down systems and item-specific mounts that are specifically designed to securely carry such items as fully-enclosed storage containers, open baskets, skis, snowboards, bicycles, fishing rods, kayaks, canoes, and surfboards.

The preferred embodiment of the present invention may be used to securely transport any variety of objects, but it is particularly useful for securing one or more surfboards to the crossbars of an after-market roof rack system. It is useful at this point, therefore, to review how the after-market roof rack systems may be used to carry a surfboard.

FIG. 1 shows a car 90 that has been equipped with a typical after-market roof rack system consisting of a base rack system 100. As shown, the base rack system 100 includes a front rack assembly 100F and a rear rack assembly 100R. Each rack assembly 100F, 100R includes a pair of towers 120, 120 mounted to the vehicle's roof 91, and a crossbar 130 that provides load support between the towers 120, 120. The base rack system 100 may be used as shown with conventional tie-downs materials, or with specialized tie-down systems, or with item-specific mounts (not shown).

The owner of a Yakima-brand or Thule-brand roof rack system could simply lay a surfboard between the crossbars and attempt to secure the surfboard with conventional tie-downs materials. In such case, however, the certainty of the attachment is highly variable, depending on the user's tie-down skills and the geometry of the surfboard (it being safer if the surfboard increases in width between the crossbars). Moreover, the surfboard is easily stolen because the conventional tie-down materials are easily cut. In addition, the user often has to stow the excess length of the conventional tie-down materials by bundling it up on the car's roof, or by dropping it through the car's window.

Both Yakima and Thule offer surfboard-specific tie-down systems or mounts. Yakima sells a so-called "StrapThang" that consists of a cloth-covered rubber loop that is secured to a "center anchor" clamped to the crossbar, stretched over the surfboard, and secured around the end of the crossbar that extends beyond the tower. If the "StrapThang" does not provide adequate tension, then it is necessary to put padding under the surfboard until the tension is reached. The "StrapThang" is easily cut offering little theft security.

Thule sells a "Hang Two" surf carrier that uses two L-shaped base units that may be variably positioned on the crossbar and clamped in place with a nut and bolt arrangement. In use, the L-shaped base units are pressed firmly against the edge of the surfboard and tightened in place. The certainty of the attachment requires the L-shaped base units to be positioned on the narrowing width of the surfboard and that is not always possible. Moreover, the surfboard is not well protected from theft because the L-shaped base units are easily released.

As should now be clear, the conventional tie-down materials and specialized tie-down systems known to the inventor are inadequate on many levels. First, they generally do not secure the surfboard(s) to the roof rack system with sufficient ease and certainty. Second, they generally offer little theft deterrent because they are easily unfastened or cut. Third, they generally do not provide any convenient means for storing the excess tie-down material.

BRIEF SUMMARY OF THE INVENTION

An object of the present invention is to provide a new and improved ratcheting strap down system that is adjustable and versatile. Another object of this invention is to secure the items with a locking mechanism. It is also a further object of the present invention to provide a ratcheting strap down system for surfboards, kayaks and other odd shaped items that can prevent theft and is simple and efficient to use.

The objects of the present invention are achieved by having a base rack system on the roof of a car, adapted to hold a ratcheting receiver with a locking mechanism, a cam clamp receiver, and a flexible strap for releasably coupling a surfboard or the like to the roof of a vehicle. The ratcheting receiver comprises a spring housing and a toothed pawl that extends from the spring housing. The toothed pawl is spring biased towards the strap. The toothed pawl has a surface with alternating teeth and indentations or ramps that correspond with the profile of the flexible strap. The teeth are inclined to either secure the strap or allow it to slide through the housing, depending on the direction the strap is traveling.

In a preferred embodiment, the strap is a steel reinforced cog belt. The cog belt includes either round protrusions, saw-like protrusions or any other shaped protrusions that allow the belt to be limited in motion by a pawl. The protrusions in the strap are preferably inclined so that a force applied to the strap in a certain direction allows the strap to slide with the incline and forces the pawl to move away from the strap. The protrusions alternate with indentations so that the pawl does not deflect if an attempt is made to force the strap in a direction opposite of the protrusion inclines.

The cam clamp receiver is adjustable in relation to the crossbar and comprises a slideable cam clamp used to secure one end of the strap to the crossbar. During use, one end of the flexible strap is coupled to the cam clamp receiver via a slideable cam. The strap is clamped between the cam clamp and the crossbar and held in a desired location on the crossbar with pressure exerted by the cam. The ratcheting receiver then vertically receives a second end of the strap through an opening and the strap connects with the toothed pawl which secures the strap at a desired length. The pawl may be retracted to allow strap removal, left in the spring-loaded ratcheting mode or fixed in place to prevent strap movement in either direction by a mechanical locking mechanism.

Any excess strap that is not being used to hold down the items is fed through an aperture located on the ratcheting receiver and into the crossbar. The strap down system is constructed to fit on either round or square crossbars, making versatility between automobiles very easy and efficient.

While the apparatus and method has or will be described for the sake of grammatical fluidity with functional explanations, it is to be expressly understood that the claims, unless expressly formulated under 35a USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35a USC 112 are to be accorded full statutory equivalents under 35a USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
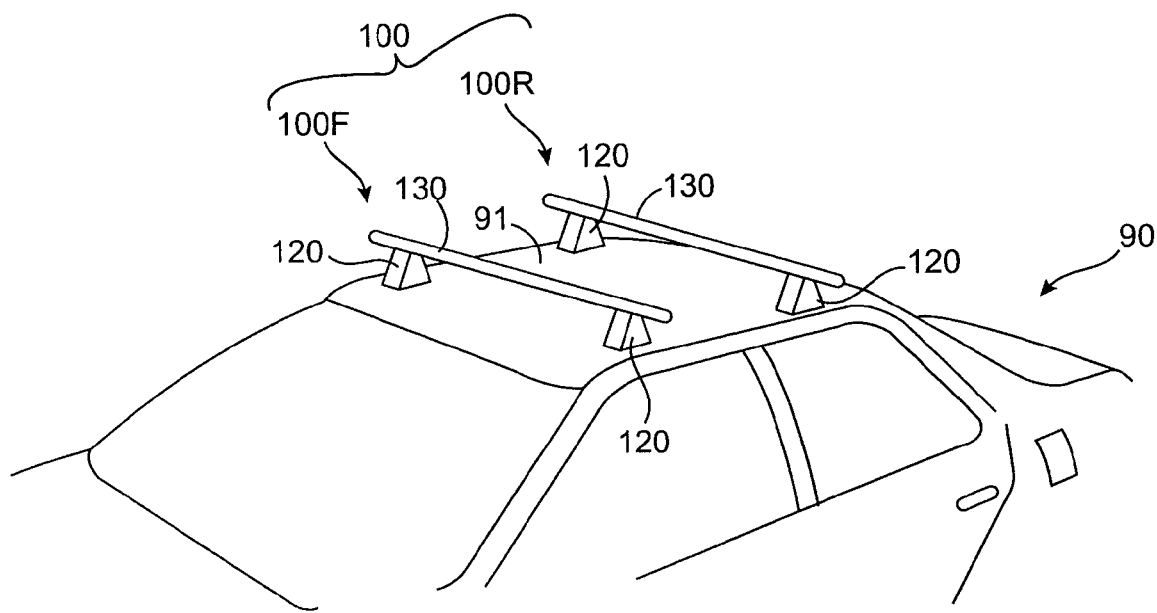
FIG. 1 shows a presently preferred embodiment of a car that has been equipped with a typical after-market roof rack system according to the present invention

Referring now in detail to the drawings, wherein the showings are for the purpose of illustrating a preferred embodiment of the invention only and not for the purpose of limiting the invention. FIG. 1 illustrates a car 90 that has been equipped with a typical after-market roof rack system consisting of a base rack system 100. As shown, the base rack system 100 includes a front rack assembly 100F and a rear rack assembly 100R. Each rack assembly 100F, 100R includes a pair of towers 120, 120 mounted to the vehicle's roof 91, and a crossbar 130 that provides load support between the towers 120, 120. The base rack system 100 may be used as shown with conventional tie-downs materials, or with specialized tie-down systems, or with item-specific mounts (not shown).

Figure 2:
FIG. 2 shows a presently preferred embodiment of a round crossbar for a roof rack system according to the present invention.
Figure 3:
FIG. 3 shows a presently preferred embodiment of a rectangular crossbar for a roof rack system according to the present invention.

FIG. 2 illustrates a circular crossbar 130 for being used in the front and rear roof rack assembly 100F, 100R such as the Yakima-brand roof rack systems use. As shown in FIG. 3, the Thule-brand roof rack systems use rectangular crossbars 130.

FIGS. 4-8 illustrate a ratcheting strap-down system according to the present invention, referred to generally as 10, that is meant to be releasably fixed to an automobile. The ratcheting strap-down system 10 comprises a flexible strap 12, a ratcheting receiver 14 and a cam clamp receiver 16. The ratcheting and cam clamp receivers 14, 16 are in the form of brackets that are adapted to be mounted on an existing crossbar 18 on an automobile. In a preferred embodiment, the cam clamp receiver 16 houses a strap actuated cam clamp 50 that engages a first end 12a of the flexible strap 12. The ratcheting receiver 14 engages a second end 12b of the flexible strap 12 through an opening 25. In a preferred embodiment, the flexible strap 12 lies parallel to the crossbar 18 and is positioned over a surfboard 20 or other item (best shown in FIG. 6). In a preferred embodiment, the strap 12 comprises a cog belt, having a cogged side 13 with cogs 33 and a flat side 15. It should be understood that the cogs 33 can be round in shape, or include saw-tooth protrusions or any other shape that will enable the pawl 32 (see FIG. 5) to limit the strap's 12 motion.

Figure 5:
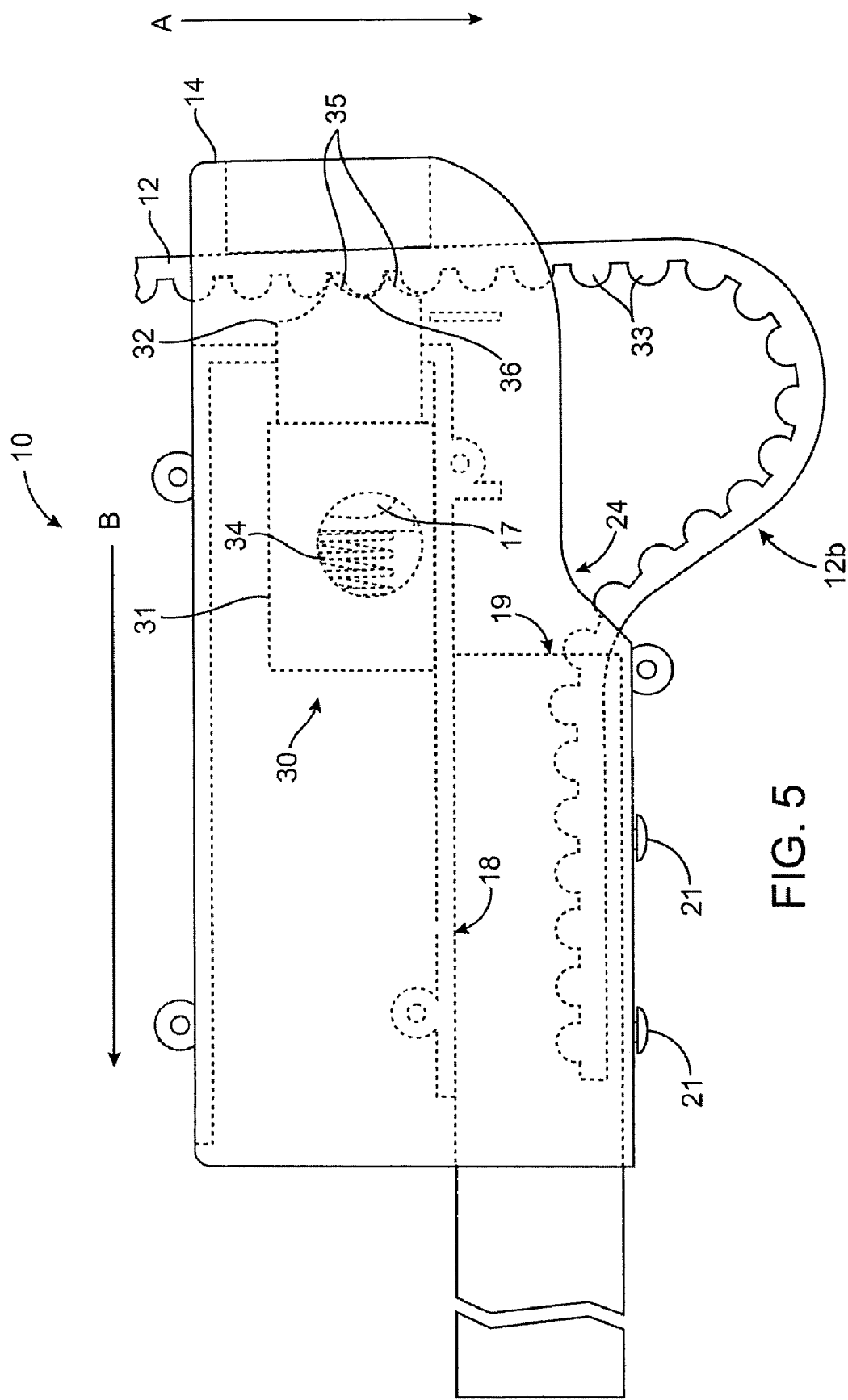
FIG. 5 shows a side view of a presently preferred embodiment of a ratcheting receiver and cog belt according to the present invention.

Best shown in FIG. 5, the ratcheting receiver 14 includes a ratcheting assembly 30. The ratcheting assembly 30 includes a spring housing 31, a toothed pawl 32 that lays perpendicular to the flexible strap 12, and a spring 34. The pawl 32 has a surface with alternating teeth 35 and indentations or ramps 36. The pawl 32 surface is adapted to mate with the cogged side 13 of the strap 12. The pawl 32 is spring biased towards the strap 12 by the spring 34. The cogged side 13 of the strap 12 forces the spring 34 and the toothed pawl 32 to move away from the strap 12 (in the direction of B) when the ramps 36 contact the cogs 33. The pawl 32 provides resistance to the strap 12 when the strap 12 travels against the teeth 35 in the pawl 32. So long as the strap 12 travels in the direction of A, the spring 34 allows the strap 12 to travel through the ratcheting receiver 14. In other words, the teeth 35 and ramps 36 of the pawl 32 fit into the cog 33 pattern of the strap 12, and therefore the strap 12 can only travel freely in the downward direction depicted by direction A.

Shown best in FIG. 5, the preferred ratcheting receiver 14, includes an aperture 24 that is aligned with an aperture 19 at the end of the crossbar 18. As a result, after pulling the strap 12 tight, any excess strap 12 that exists can be conveniently inserted into the aperture 24 and into the crossbar 18. In one preferred embodiment, the ratcheting receiver 14 is secured to the crossbar 18 with set screws 21.

In a preferred embodiment, the ratcheting receiver 14 comprises a release mechanism. Also in a preferred embodiment, the release mechanism is a key lock 22 having a key operated pin 23. The ratcheting receiver 14 has a milled slot 17, that receives the key operated pin 23 (shown in FIG. 6) to move the toothed pawl 32 away from the flexible strap 12 and release the flexible strap 12, or to move the toothed pawl 32 toward the flexible strap 12 and lock it in place. The normal position of the key operated pin 23 is neutral to allow the pawl 32 to ratchet.

Figure 4:
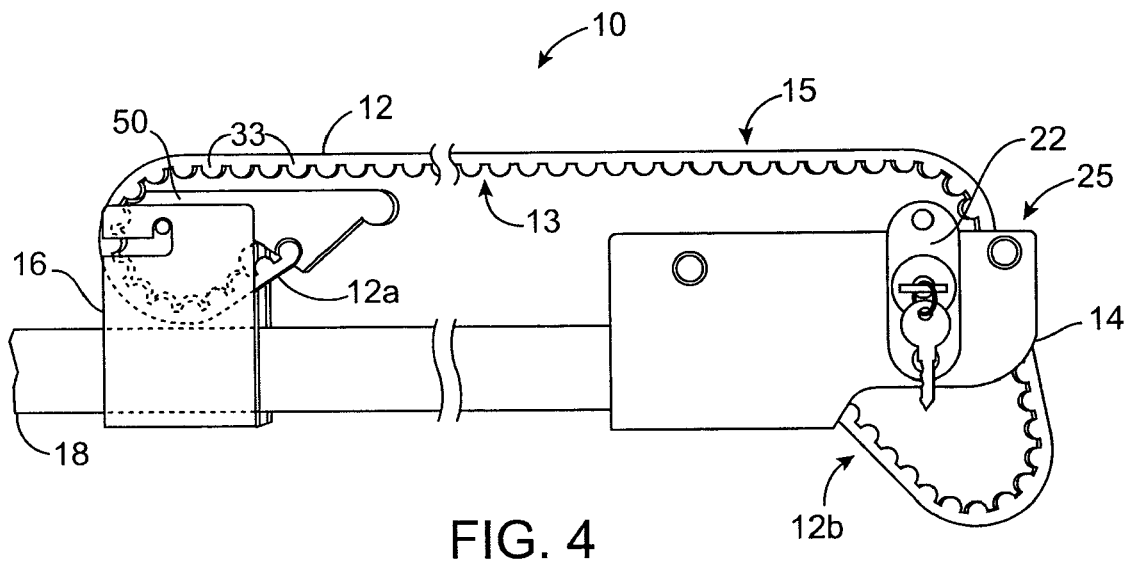
FIG. 4 shows a side view of a presently preferred embodiment of a ratcheting strap down system according to the present invention.
Figure 6:
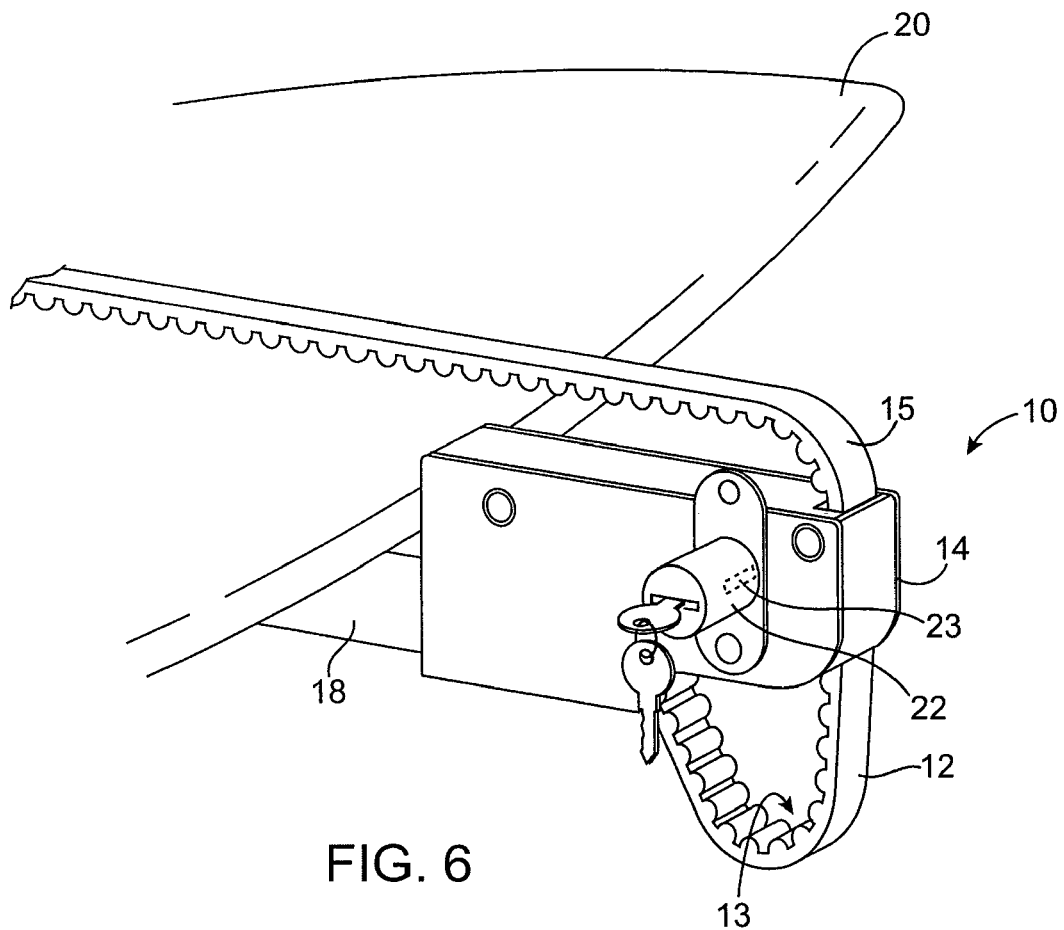
FIG. 6 shows a perspective view of a presently preferred embodiment of a surfboard locked within a ratcheting strap down system according to the present invention.

FIGS. 4 and 6 generally refer to the functionality of the ratcheting strap-down system 10. As shown by FIG. 4, the two receivers 14, 16 may be mounted to the crossbar at different, spaced apart locations to create a variable-width gap therebetween. Once the two receivers 14, 16 are stabilized at desired locations on the crossbar 18 to create the desired gap, the strap 12 lays above and parallel to the cross bar 18 within the span of that gap. This allows a surfboard 20 to be secured between the cross bar 18 and the strap 12, within the gap. Although a surfboard 20 is the only item illustrated in the figures, it is understood that any other item such as a ladder (not shown), kayak (not shown), luggage (not shown) or any other item preferably having a length that extends over two crossbars 18 on the vehicle can be secured. The surfboard 20 is inserted over the cross bar 18 and under the strap 12 between the ratcheting receiver 14 and the cam clamp receiver 16. It is also understood that the surfboard 20 can first be placed on the crossbars 18 and then the strap 12 is positioned over the item. Next, the second end 12b of the strap 12 is received by the ratcheting receiver 14 to secure the item to the crossbar 18. This method allows the flexible strap to be tightly positioned over a portion of the item to secure it to the crossbar 18.

Figure 7A:
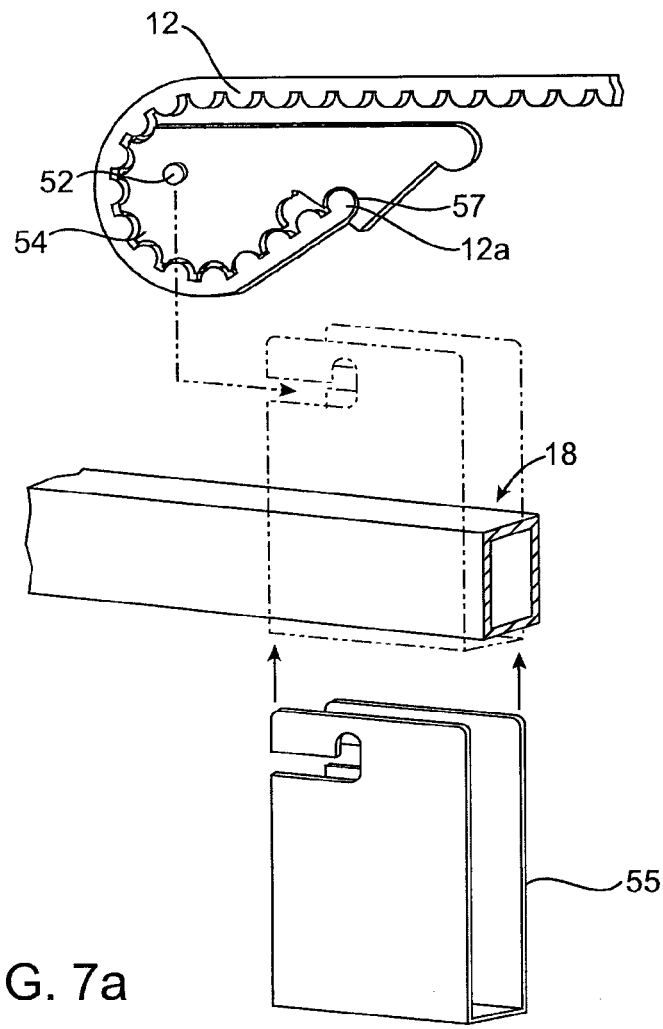
FIG. 7a shows a preferred assembly process of a presently preferred embodiment of a cam clamp receiver according to the present invention.
Figure 7B:
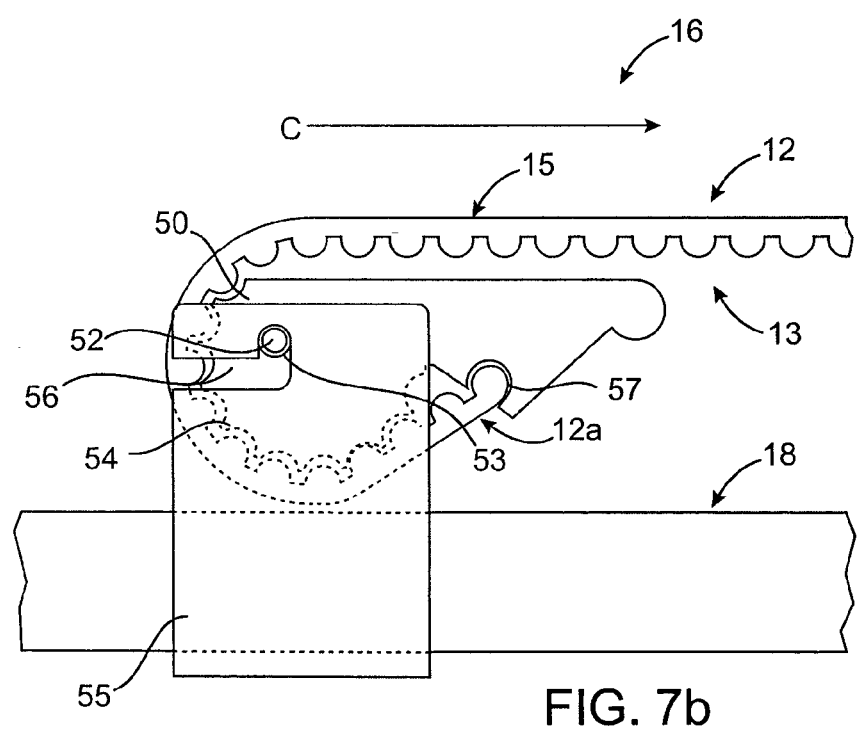
FIG. 7b shows a see through view of a presently preferred embodiment of a cam clamp receiver according to the present invention.

FIGS. 7a and 7b show a preferred method of assembling the cam clamp receiver 16 to the crossbar 18 according to the present invention. FIG. 7a shows a cam clamp receiver 16 comprising a strap actuated cam clamp 50. One end of the strap 12a is coupled to the cam clamp 50 via a strap-receiving indent 57. The cam clamp 50 is coupled to the cam clamp receiver 16 with a pin 52 that the clamp pivots on. The pin 52 aligns with a slotted hole 56.

The cam clamp receiver 16 includes a U-shaped bracket 55 that slides onto and engages the crossbar 18 from the bottom. The cam clamp 50 is coupled to the bracket 55 by positioning the clamp 50 so that the pin 52 from the cam clamp aligns with a slotted hole 56 of the bracket 55.

As shown in FIG. 7b, the strap 12 is wrapped around the clamp 50 and pulled tight in the direction of C. When force is applied to the strap in the direction of C, the cam clamp 50 cinches the strap 12 onto a desired position of the crossbar 18. The pin 52 is engaged within the milled hole 53 and stabilizes the bracket 55 on the crossbar 18. In a preferred embodiment, the cam clamp 50 comprises cogged detents 54 that are adapted to mate with the cogged side 13 of the strap 12.

Figure 8:
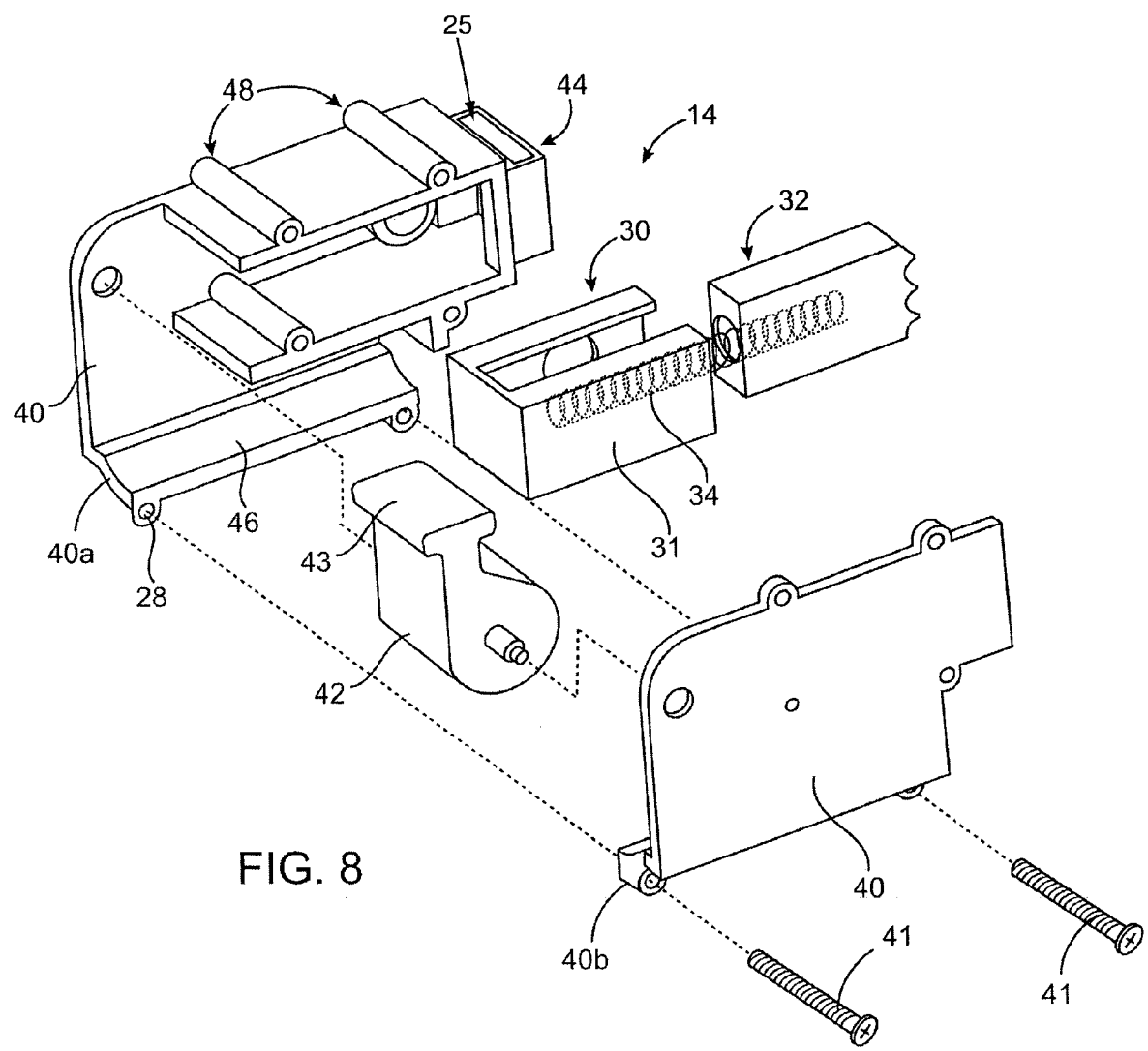
FIG. 8 shows an exploded perspective view of a presently preferred embodiment of a ratcheting receiver according to the present invention.

FIG. 8 shows an exploded view of a second embodiment of the ratcheting receiver 14. The ratcheting receiver 14 comprises a first housing 40, made of two connectable pieces 40a and 40b. The connectable housing pieces 40a and 40b are coupled together by fasteners 41 through apertures 28 on both the pieces 40a and 40b. In a second preferred embodiment, the first housing 40 is retained on the crossbar 18 by a lever actuated cam 42 that clamps down on the crossbar 18. The lever-actuated cam 42 includes a lever handle 43 that can be pressed down to clamp and cinch the ratcheting receiver 14 to the crossbar 18.

The ratcheting receiver 14 includes a recess 44 that allows pawl 32 to extend through the first bracket 40. The spring-loaded pawl 32 extends into the recess 44 and engages the strap 12 which is inserted through the opening 25.

Figure 9:
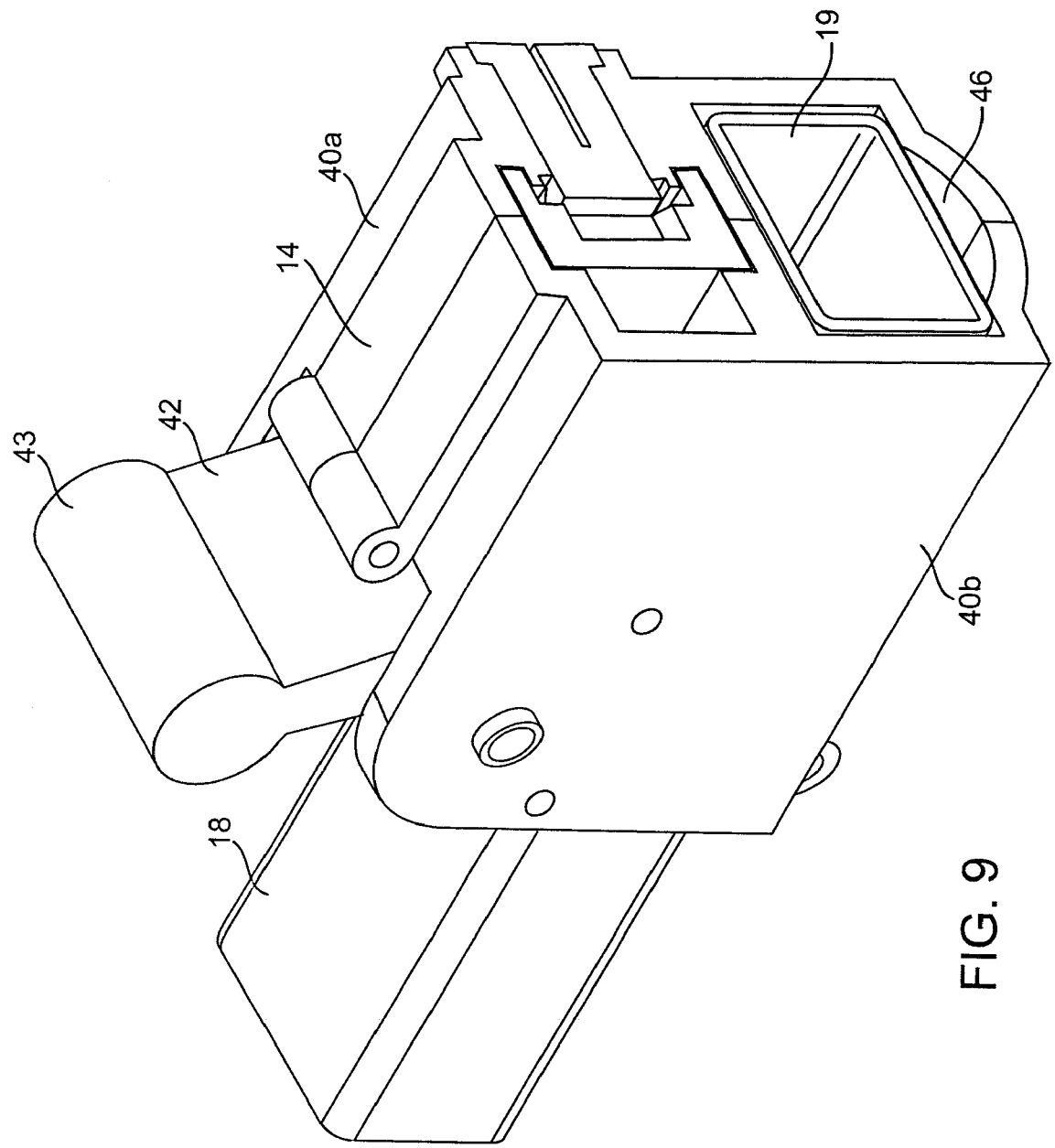
FIG. 9 shows a partial perspective view of a presently preferred embodiment of a ratcheting receiver adapted to hold a square crossbar according to the present invention.
Figure 10:
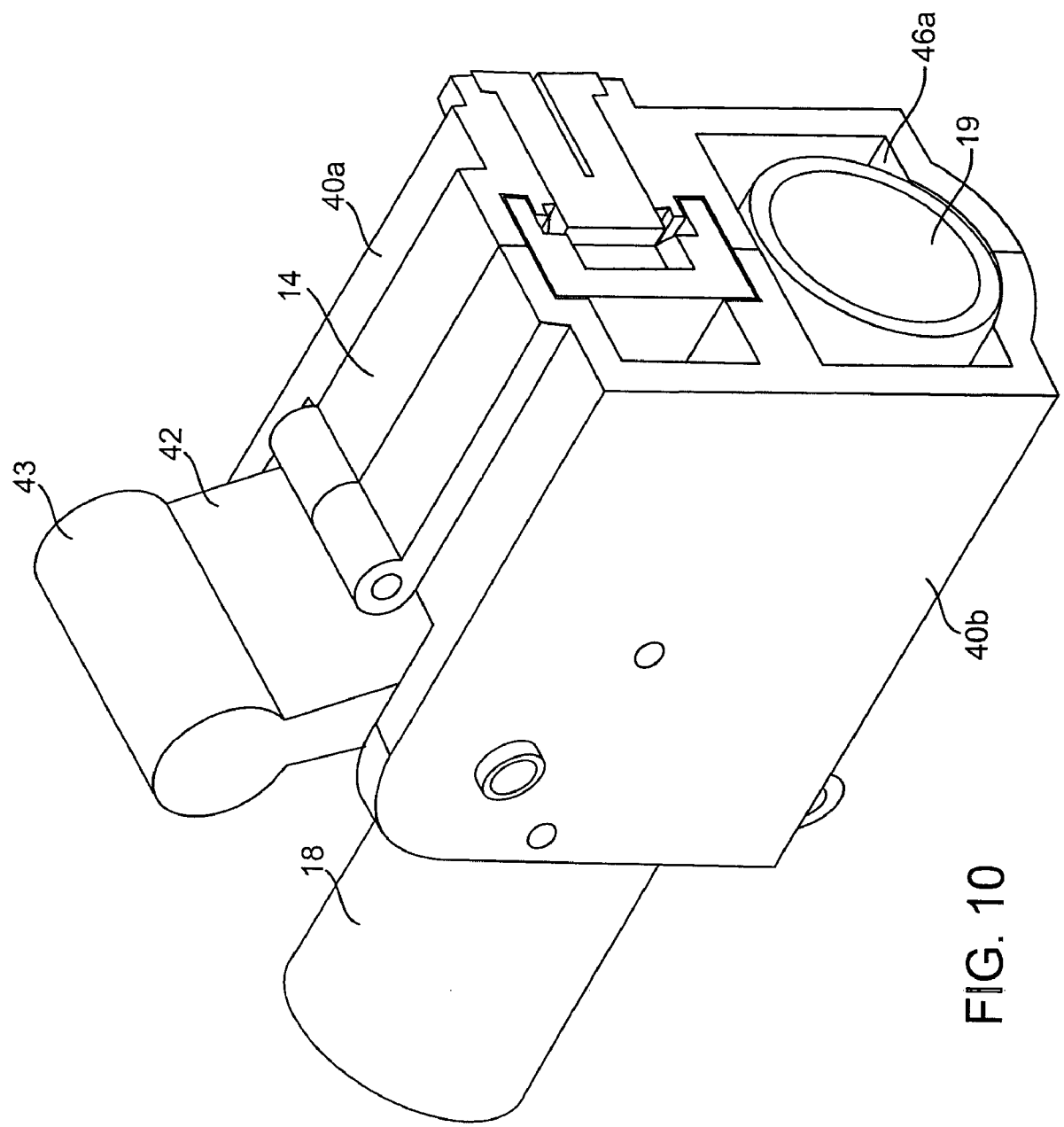
FIG. 10 shows a partial perspective view of a presently preferred embodiment of a ratcheting receiver adapted to hold a round crossbar according to the present invention.

Best shown in FIGS. 9 and 10 a crossbar platform 46 is adapted to receive both a round and a square crossbar 18. This allows the ratcheting strap-down system 10 to be easily and conveniently mounted on most after-market base rack systems 100, including Yakima and Thule. The lever actuated cam 43 is operated by the handle 43 and cinches the ratcheting receiver 14 to the crossbar 18.

By utilizing this multi-configuration and multi-purpose locking system, one item can be secured or multiple items can be stacked on top of one another or beside each other. The preferred embodiment of the invention allows for various sizes and shapes of items to be mismatched and still secured from unauthorized persons.

Many alterations and modifications may be made by those having ordinary skill in the art without departing from the spirit and scope of the invention. For example, the strap 12 can be any form of threading, rubberized material, steel reinforced cable or any other cords that can be inserted through the ratcheting receiver and the cam clamp receiver 14, 16. The receivers 14, 16 can be made from most metal materials or a plastic component. It is also understood that the pawl 32 can be of any structural shape that allows it to engage and lock the strap 12. The releasing mechanism can be any form of lock.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A variable-width ratcheting strap-down system for use with a crossbar, comprising:
   a flexible strap having a first end and a second end;
   a first receiver adapted to engage the first end of the flexible strap, the first receiver comprising a first crossbar bracket that is mounted on the crossbar at a first crossbar location; and
   a second receiver adapted to receive the second end of the flexible strap, the second receiver comprising a second bracket that is mounted on the crossbar at a second crossbar location that is different from the first crossbar location to provide a gap having a width that is between the first and second receivers and is spanned by the flexible strap, the second receiver having a ratcheting assembly that is adapted to tighten the flexible strap within the gap between the first and second receivers,
   wherein at least one of the first and second crossbar brackets is adapted to be moveably adjusted along the crossbar to vary the width of the gap between the first and second receivers,
   wherein the first receiver houses a cam clamp, and
   wherein the cam clamp presses the flexible strap against the crossbar when the flexible strap is pulled in the direction of the second receiver, the cam clamp cinching the strap and the first receiver to the first crossbar location.

2. The variable-width ratcheting strap-down system according to claim 1, wherein the strap comprises a steel reinforced cog belt having a flat side and a cogged side.

3. The variable-width ratcheting strap-down system according to claim 2, wherein the ratcheting assembly comprises a toothed pawl perpendicular to the flexible strap, the pawl being spring biased towards the strap and having a surface with alternating teeth and ramps that correspond to the cogged side of the strap.

4. The variable-width ratcheting strap-down system according to claim 3, wherein the pawl engages the cogged side of the strap when the strap is traveling against the teeth in the pawl.

5. The variable-width ratcheting strap-down system according to claim 2, wherein cam clamp has cogged detents, and wherein the cogged detents are adapted to mate with the cogged side of the strap.

6. The variable-width ratcheting strap-down system according to claim 3, further comprising a spring located within the ratcheting assembly, wherein when a force is applied to the strap in a first direction, the spring is moved away from the strap so as to allow the strap to travel through the ratcheting receiver.

7. The variable-width ratcheting strap-down system of claim 3, wherein the pawl provides resistance to the movement of the strap when the strap travels in a second direction.

8. The variable-width ratcheting strap-down system according to claim 1, wherein the second receiver further comprises a release mechanism.

9. The variable-width ratcheting strap-down system of claim 8, wherein the release mechanism is a key lock having a key operated pin.

10. The variable-width ratcheting strap-down system according to claim 8, wherein the first receiver can only be released and repositioned when the flexible strap is released from the second receiver by the release mechanism.

11. The variable-width ratcheting strap-down system according to claim 1, wherein the second bracket further comprises an aperture that is aligned with an aperture in the crossbar, so as to store any excess strap within the aperture in the crossbar.

12. The variable-width ratcheting strap-down system according to claim 1, wherein the first receiver and the second receiver are adapted to be engaged to a round crossbar.

13. The variable-width ratcheting strap-down system according to claim 1, wherein the first receiver and the second receiver are adapted to be engaged to a square crossbar.

14. The variable-width ratcheting strap-down system according to claim 3, wherein the toothed pawl comprises a milled slot adapted to hold a key operated pin that rotates in the milled slot so as to allow the toothed pawl to move away from the flexible strap and disengage the flexible strap.

15. The variable-width ratcheting strap-down system according to claim 1, wherein the strap connects with each receiver only once.

16. A variable-width ratcheting strap-down system for use with a crossbar, comprising:
   a flexible strap, wherein the flexible strap comprises a cog belt;
   a cam clamp receiver including a U-shaped bracket having a base and two arms extending from one side of the crossbar and a strap-actuated cam clamp pivotally connected between the two arms of the U-shaped bracket on an opposite side of the crossbar, the cam clamp permitting the cam clamp receiver to be moved to a first desired position when the strap is loose and the cam clamp forcibly presses a first end of the flexible strap against the crossbar when the strap is pulled away from the cam clamp receiver to secure the cam clamp receiver in the first desired position; and
   a ratcheting receiver located in a second desired position and adapted to engage a second end of the cog belt and hold the strap tight when the second end of the strap is pulled away from the cam clamp of the cam clamp receiver;
   wherein the ratcheting receiver further comprises a spring loaded ratcheting assembly.

17. The variable-width ratcheting strap-down system according to claim 16, wherein the cam clamp comprises cogged indentations that are adapted to mate with a cogged side of the strap.

18. The variable-width ratcheting strap-down system according to claim 16, wherein the ratcheting assembly further comprises a toothed pawl that lays perpendicular to the flexible strap and is spring biased towards the strap.

19. The variable-width ratcheting strap-down system according to claim 18, wherein the pawl has a surface with alternating teeth and indentations, the surface being adapted to mate with the cogged side of the strap.

20. The variable-width ratcheting strap-down system according to claim 19, further comprising a spring located within the ratcheting assembly;
   wherein when a force is applied to the strap in a first direction, the spring is moved away from the strap so as to allow the strap to travel through the ratcheting receiver, and the strap movement is resisted when force is applied in a second direction.

21. A variable-width ratcheting strap-down system for use with a crossbar, comprising:
   a flexible strap having a first end and a second end, wherein the flexible strap is a cog belt;
   a cam clamp receiver adapted to engage the first end of the flexible strap, wherein the cam clamp receiver houses a strap actuated cam clamp that permits the cam clamp receiver to be moved to a first desired position between the first and second ends of the crossbar when the strap is loose and forcibly presses the flexible strap against the crossbar to secure the cam clamp receiver to the crossbar at the first desired position when the strap is tight; and a ratcheting receiver, being constructed to connect to the second end of the crossbar and having a ratcheting assembly adapted to engage the second end of the flexible strap and hold the strap tight when the second end of the strap is pulled away from the cam clamp of the cam clamp receiver.

22. The variable-width ratcheting strap-down system of claim 21, wherein the ratcheting receiver houses a spring-loaded toothed pawl that lays perpendicular to the flexible strap and the pawl comprises alternating teeth and ramps that are adapted to mate with a pattern on the strap.

23. The variable-width ratcheting strap-down system of claim 21, wherein the ratcheting receiver houses a spring-loaded toothed pawl that has inclined teeth and lays perpendicular to the flexible strap and the pawl secures the strap when the strap is traveling against the inclined teeth.

24. A method of assembling a ratcheting strap-down system to a hollow crossbar comprising;

coupling a flexible strap with a first receiver that is coupled to the hollow crossbar;

positioning the strap over a portion of an item;

inserting the strap into a second receiver that is coupled to the hollow crossbar, the second receiving having a ratcheting assembly, the ratcheting assembly including a spring biased pawl;

pulling the strap tight past the spring-biased pawl;

pressing the pawl against the strap; and containing any unused strap within the hollow crossbar via a cavity located on the second receiver.

25. A variable-width ratcheting strap-down system for use with a crossbar, comprising:

a flexible strap having a first end and a second end; and a variable position receiver connected to the first end of the flexible strap and slidably coupled to the crossbar, the variable position receiver including a tension activated mechanism that permits the receiver and first end of the flexible strap to be moved to a desired position along the crossbar when the flexible strap is loose and holds the receiver and first end of the flexible strap at the desired position when the strap is pulled tight, wherein the variable position receiver comprises a first sliding bracket that is adapted to be moveably adjusted on the crossbar and fixed at the desired location on the crossbar, and wherein the variable position receiver further comprises a cam clamp that forcibly presses the flexible strap against the crossbar when the strap is pulled tight away from the cam clamp.

* * * * *